US011228600B2

(12) United States Patent
Takeuchi et al.

(10) Patent No.: US 11,228,600 B2
(45) Date of Patent: Jan. 18, 2022

(54) CAR SHARING SYSTEM

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Hajime Takeuchi, Aichi (JP); Masaki Hayashi, Aichi (JP); Masahiko Oya, Aichi (JP); Hidenobu Hanaki, Aichi (JP); Junji Murase, Aichi (JP); Yosuke Doi, Aichi (JP); Masaki Oshima, Aichi (JP); Yuichiro Haruna, Oyama (JP)

(73) Assignees: KABUSHIKI KAISHA TOKAI RIKA DENKI SEISAKUSHO, Aichi (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 150 days.

(21) Appl. No.: 16/151,943

(22) Filed: Oct. 4, 2018

(65) Prior Publication Data
US 2019/0109855 A1    Apr. 11, 2019

(51) Int. Cl.
*H04L 29/06*      (2006.01)
*H04W 12/06*    (2021.01)
*H04L 9/08*        (2006.01)
*H04L 9/32*        (2006.01)
*H04W 12/04*    (2021.01)
(Continued)

(52) U.S. Cl.
CPC .......... *H04L 63/104* (2013.01); *H04L 9/0861* (2013.01); *H04L 9/0891* (2013.01); *H04L 9/3226* (2013.01); *H04L 9/3271* (2013.01); *H04L 63/068* (2013.01); *H04W 4/48* (2018.02); *H04W 4/80* (2018.02); *H04W 12/04* (2013.01); *H04W 12/06* (2013.01);
(Continued)

(58) Field of Classification Search
None
See application file for complete search history.

(56) References Cited

U.S. PATENT DOCUMENTS 8,590,021 B2 * 11/2013 Steeves ............... H04L 63/0492
726/5
8,594,616 B2 * 11/2013 Gusikhin ................ H04W 4/44
455/404.1
(Continued)

FOREIGN PATENT DOCUMENTS

JP    2012-221224 A    11/2012
JP    2016-071834 A    5/2016
(Continued)

OTHER PUBLICATIONS

NPL Search Terms (Year: 2021).*

*Primary Examiner* — Syed A Zaidi
(74) *Attorney, Agent, or Firm* — Greenblum & Bernstein, P.L.C.

(57) ABSTRACT

The car sharing system includes a car share device and an encryption code updating unit. The car share device is configured to perform wireless communicate with a mobile terminal that is operable as a vehicle key. The encryption code updating unit updates a first encryption code, which was used during a previous connection of the mobile terminal and the car share device, to a second encryption code, which differs from the first encryption code, when the mobile terminal and the car share device are reconnected.

4 Claims, 3 Drawing Sheets

(51) Int. Cl.
*H04W 4/80* (2018.01)
*H04W 4/48* (2018.01)
*H04W 12/069* (2021.01)

(52) U.S. Cl.
CPC ....... *H04W 12/069* (2021.01); *H04L 2209/80* (2013.01); *H04L 2209/84* (2013.01)

(56) References Cited

U.S. PATENT DOCUMENTS

| | | | | |
|---|---|---|---|---|
| 8,655,274 B2* | 2/2014 | Walker | ............... | H04W 4/80 |
| | | | | 455/41.1 |
| 8,682,245 B2* | 3/2014 | Fyke | ............... | G07C 9/20 |
| | | | | 455/41.1 |
| 8,869,263 B2* | 10/2014 | Pasquero | ............... | G06F 21/35 |
| | | | | 726/17 |
| 8,880,028 B2* | 11/2014 | Han | ............... | H04M 1/7253 |
| | | | | 455/411 |
| 9,031,540 B2* | 5/2015 | Mathews | ............... | H04W 12/06 |
| | | | | 455/411 |
| 9,070,279 B2* | 6/2015 | Shimizu | ............... | H04L 9/3226 |
| 9,094,382 B2* | 7/2015 | Kawamura | ............... | H04L 9/0869 |
| 9,132,806 B2* | 9/2015 | De Los Santos | ............... | H04L 63/125 |
| 9,137,658 B2* | 9/2015 | Kawamura | ............... | H04L 9/3271 |
| 9,143,320 B2* | 9/2015 | Kawamura | ............... | H04L 9/0816 |
| 9,168,895 B2* | 10/2015 | Hatton | ............... | G06F 17/00 |
| 9,294,476 B1* | 3/2016 | Lurey | ............... | H04L 63/0861 |
| 9,301,337 B2* | 3/2016 | Brown | ............... | H04B 5/02 |
| 9,306,735 B2* | 4/2016 | Kawamura | ............... | B60R 25/24 |
| 9,397,829 B2* | 7/2016 | Iwashita | ............... | H04L 9/0861 |
| 9,509,496 B2* | 11/2016 | Kawamura | ............... | B60R 25/24 |
| 9,509,499 B2* | 11/2016 | Kawamura | ............... | H04L 9/0869 |
| 9,577,997 B2* | 2/2017 | Mabuchi | ............... | H04L 67/12 |
| 9,593,522 B1* | 3/2017 | Murar | ............... | E05F 15/77 |
| 9,666,005 B2* | 5/2017 | Ellis | ............... | G07C 9/00309 |
| 9,693,214 B2* | 6/2017 | Hyde | ............... | H04W 4/24 |
| 9,714,004 B2* | 7/2017 | Kawamura | ............... | G06F 21/35 |
| 9,727,922 B1* | 8/2017 | Saenglongma | .... | G06Q 30/0645 |
| 9,740,875 B2* | 8/2017 | Jung | ............... | H04M 3/42102 |
| 9,742,771 B2* | 8/2017 | Smith | ............... | H04L 63/10 |
| 9,754,431 B2* | 9/2017 | Sigal | ............... | G07C 9/00571 |
| 9,807,547 B1* | 10/2017 | Oesterling | ............... | G06Q 30/02 |
| 9,865,113 B2* | 1/2018 | Maiwand | ............... | G07C 9/00182 |
| 9,875,589 B1* | 1/2018 | Buttolo | ............... | G07C 9/00174 |
| 10,158,550 B2* | 12/2018 | Trani | ............... | G01S 5/00 |
| 10,187,793 B2* | 1/2019 | Petel | ............... | H04L 63/0492 |
| 10,200,371 B2* | 2/2019 | Darnell | ............... | H04L 9/0866 |
| 10,242,516 B2* | 3/2019 | Konishi | ............... | G06Q 10/02 |
| 10,318,854 B2* | 6/2019 | Davis | ............... | G06K 19/0727 |
| 10,319,167 B1* | 6/2019 | Oesterling | ........ | G07C 9/00174 |
| 10,467,577 B2* | 11/2019 | James | ............... | G06Q 10/08 |
| 10,477,402 B2* | 11/2019 | Ho | ............... | H04W 12/12 |
| 10,484,360 B2* | 11/2019 | Winkelvos | ............... | H04L 63/18 |
| 10,501,053 B2* | 12/2019 | Tokunaga | ............... | B60R 25/24 |
| 10,532,720 B2* | 1/2020 | Froitzheim | ............... | B60R 25/24 |
| 2008/0059799 A1* | 3/2008 | Scarlata | ............... | H04L 9/0897 |
| | | | | 713/176 |
| 2010/0098243 A1* | 4/2010 | Chopart | ............... | H04L 9/3247 |
| | | | | 380/28 |
| 2010/0228405 A1* | 9/2010 | Morgal | ............... | B62H 3/02 |
| | | | | 701/2 |
| 2011/0264304 A1* | 10/2011 | Burzio | ............... | B60R 25/2081 |
| | | | | 701/2 |
| 2013/0237174 A1* | 9/2013 | Gusikhin | ............... | H04W 4/90 |
| | | | | 455/404.1 |
| 2014/0143839 A1* | 5/2014 | Ricci | ............... | G06F 21/602 |
| | | | | 726/4 |
| 2014/0207517 A1* | 7/2014 | Oshima | ............... | H04L 67/146 |
| | | | | 705/7.29 |
| 2014/0232903 A1* | 8/2014 | Oshima | ............... | H04B 10/541 |
| | | | | 348/229.1 |
| 2014/0266594 A1* | 9/2014 | Reiser | ............... | G06F 3/04842 |
| | | | | 340/5.72 |
| 2014/0307724 A1* | 10/2014 | Ricci | ............... | G08G 1/096775 |
| | | | | 370/338 |
| 2015/0095997 A1* | 4/2015 | Mabuchi | ............... | H04L 63/08 |
| | | | | 726/6 |
| 2016/0036586 A1* | 2/2016 | Murakami | ........... | G07B 15/063 |
| | | | | 380/270 |
| 2016/0150404 A1 | 5/2016 | Sugitani | | |
| 2016/0191584 A1* | 6/2016 | Dickow | ............... | H04L 67/12 |
| | | | | 709/219 |
| 2016/0222903 A1* | 8/2016 | Glauber | ............... | F02D 41/2422 |
| 2016/0260269 A1* | 9/2016 | Pietschmann | ...... | G06Q 30/0269 |
| 2016/0318481 A1* | 11/2016 | Penilla | ............... | G06Q 10/02 |
| 2016/0358389 A1* | 12/2016 | Menard | ........... | H04W 12/04031 |
| 2017/0018182 A1* | 1/2017 | Makled | ............... | G08G 1/087 |
| 2017/0063807 A1* | 3/2017 | Cheng | ............... | H04L 67/125 |
| 2017/0104824 A1* | 4/2017 | Bajwa | ............... | H04W 4/44 |
| 2017/0105120 A1* | 4/2017 | Kang | ............... | H04L 63/0876 |
| 2017/0186251 A1* | 6/2017 | Lee | ............... | G07C 9/20 |
| 2017/0257345 A1* | 9/2017 | Westra | ............... | H04W 12/06 |
| 2017/0316621 A1* | 11/2017 | Jefferies | ............... | G06Q 30/0645 |
| 2018/0006829 A1* | 1/2018 | Kravitz | ............... | H04L 9/3268 |
| 2018/0091930 A1* | 3/2018 | Jefferies | ............ | H04W 12/0804 |
| 2018/0130274 A1* | 5/2018 | Hernandez | ........ | G07C 9/00309 |
| 2018/0154867 A1* | 6/2018 | Golduber | ............... | G07B 15/00 |
| 2018/0218613 A1* | 8/2018 | Oesterling | ............... | G08G 1/042 |
| 2018/0295518 A1* | 10/2018 | Alloche | ............... | H04L 9/3268 |
| 2018/0334138 A1* | 11/2018 | Namineni | ......... | H04W 12/0403 |
| 2018/0351746 A1* | 12/2018 | Yoon | ............... | H04L 9/12 |
| 2018/0352583 A1* | 12/2018 | Smith | ............... | H04W 76/34 |
| 2019/0192055 A1* | 6/2019 | Mizobuchi | ............... | B60R 11/02 |
| 2020/0052905 A1* | 2/2020 | Mathias | ............... | H04L 9/006 |

FOREIGN PATENT DOCUMENTS

JP 2016-100757 A 5/2016
JP 2016-115077 A 6/2016

* cited by examiner

Fig.1
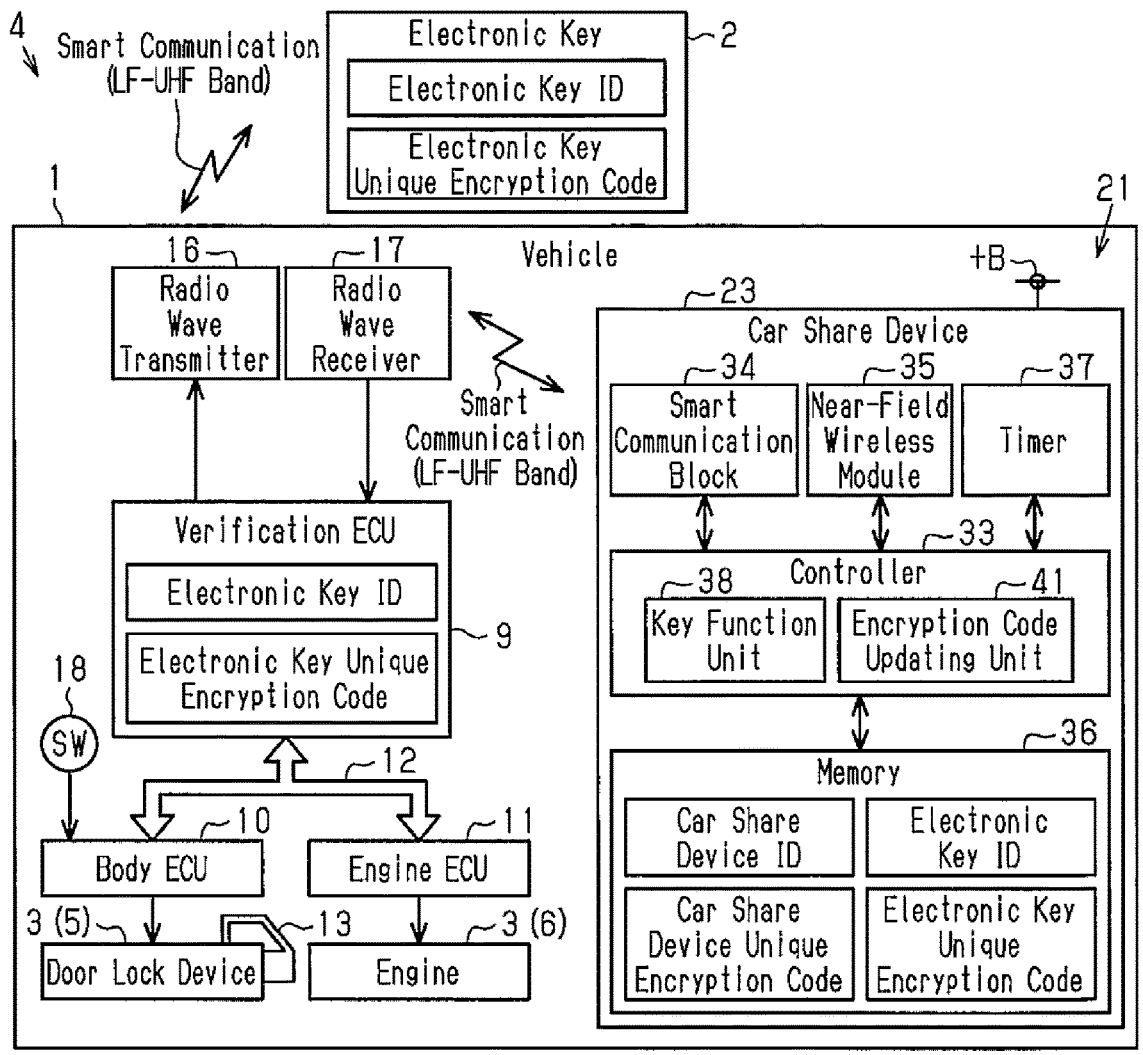
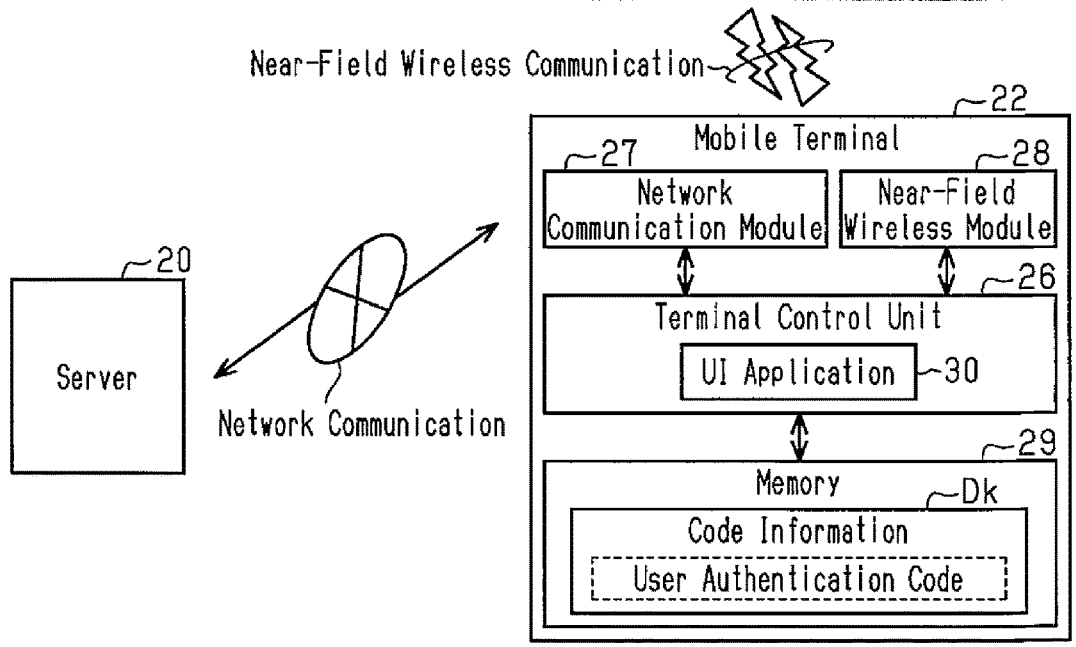

CAR SHARING SYSTEM

CROSS-REFERENCE TO RELATED APPLICATIONS

This application is based upon and claims the benefit of priority from prior Japanese Patent Application No. 2017-196933, filed on Oct. 10, 2017, the entire contents of which are incorporated herein by reference.

FIELD

This disclosure relates to a car sharing system that shares a vehicle with a number of people.

BACKGROUND

Japanese Laid-Open Patent Publication Nos. 2016-115077 and 2016-71834 describe a car sharing system that shares a vehicle with a number of people. In such type of a car sharing system, for example, after registering for usage of the car share system, a reservation for a car is made with a mobile terminal (e.g., smartphone) to obtain permission to use the vehicle during the reserved time.

SUMMARY

In the car sharing system, a car share device may be installed in a vehicle. The car share device is configured to establish communication with a mobile terminal. The car share device allows the mobile terminal to be used in place of an electronic key (vehicle key). The car share device communicates with the mobile terminal and uses a versatile electronic key system to actuate an on-board device. In this case, when the communication between the mobile terminal and the car share device is tapped and encoded, the vehicle may be used in an unauthorized manner. Thus, there is a need to improve security.

One embodiment of a car sharing system includes a car share device and an encryption code updating unit. The car share device is installed in a vehicle and configured to verify an electronic key ID used by an electronic key system of the vehicle. The car share device is configured to communicate with a mobile terminal that is operable as a vehicle key when code information is registered to the mobile terminal. The car share device is further configured to authenticate the code information through wireless communication with the mobile terminal and permit actuation of an on-board device by verifying the electronic key ID with the electronic key system when the mobile terminal is operated to actuate the on-board device. The encryption code updating unit updates an encryption code used for encrypted communication between the mobile terminal and the car share device. The encryption code updating unit updates a first encryption code, which was used during a previous connection of the mobile terminal and the car share device, to a second encryption code, which differs from the first encryption code, when the mobile terminal and the car share device are reconnected.

Other embodiments and advantages thereof will become apparent from the following description, taken in conjunction with the accompanying drawings, illustrating by way of example the principles of the invention. It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which:

FIG. 1 is a schematic block diagram illustrating one embodiment of a car sharing system;

DESCRIPTION OF THE EMBODIMENTS

Figure 2:
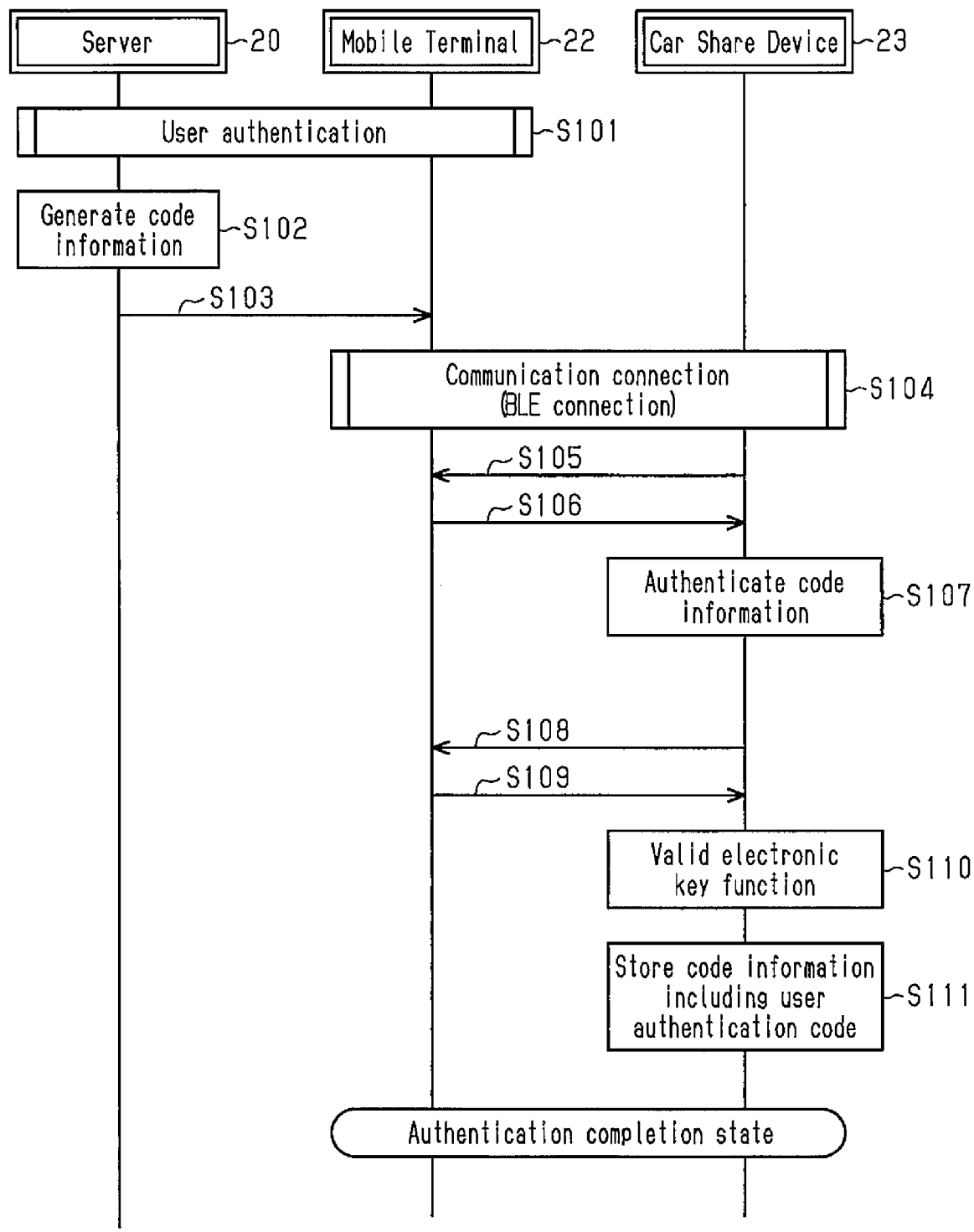
FIG. 2 is a diagram illustrating an example communication sequence for code information authentication.

One embodiment of a car sharing system will now be described with reference to FIGS. 1 to 5.

As illustrated in FIG. 1, a vehicle 1 is provided with an electronic key system 4. In one embodiment, the electronic key system 4 includes an electronic key 2 (vehicle key) and a verification electronic control unit (ECU) 9 that verifies the ID of the electronic key 2 through wireless communication with the electronic key 2. The verification ECU 9 executes or permits actuation of an on-board device 3 upon ID verification accomplishment of the electronic key 2. The electronic key system 4, which is a key-operation-free system, performs electronic key ID verification (also referred to as smart verification) through short range wireless communication initiated by the vehicle 1 (verification ECU 9). In the key-operation-free system, electronic key ID verification is automatically performed without directly operating the electronic key 2. The on-board device 3 may include, but not limited to, for example, a door lock device 5 and an engine 6.

The vehicle 1 includes the verification ECU 9, a body ECU 10 that manages the power supply for on-board electrical devices, and an engine ECU 11 that controls the engine 6. The body ECU 10 and the engine ECU 11 are each referred to as an on-board device ECU. The ECUs 9 to 11 are electrically connected to one another by a communication line 12 in the vehicle 1. The communication line 12 is, for example, a Controller Area Network (CAN), a Local Interconnect Network (LAN), or a combination of these networks. The verification ECU 9 and the electronic key 2 each include a memory (not illustrated) that stores an electronic key ID and an electronic key unique encryption code. The electronic key ID and the electronic key unique encryption code are information unique to the electronic key 2 that is registered to the vehicle 1 and used for electronic key ID verification. The body ECU 10 controls the door lock device 5 that locks and unlocks the vehicle door 13.

The electronic key system 4 further includes a radio wave transmitter 16 and a radio wave receiver 17 that are arranged in the vehicle 1. For example, the radio wave transmitter 16 may include an exterior transmitter (not illustrated) that transmits radio waves to the outside of the vehicle 1 and an interior transmitter (not illustrated) that transmits radio waves to the inside of the vehicle 1. The radio wave transmitter 16 transmits radio waves on the low frequency (LF) band. The radio wave receiver 17 receives radio waves on the ultrahigh frequency (UHF) band. Accordingly, in the electronic key system 4, the verification ECU 9 communicates with the electronic key 2 through LF-UHF bidirectional communication.

As the electronic key 2 enters a communication area formed by a wake signal on LF radio waves transmitted from the radio wave transmitter 16, the electronic key 2 receives the wake signal and shifts from a standby state to an activated state. Upon activation of the electronic key 2, the verification ECU 9 performs ID verification (smart verification) on the electronic key 2. In a non-restrictive example, the smart verification performed between the electronic key 2 and the verification ECU 9 includes electronic key ID verification that authenticates the electronic key 2 and challenge-response authentication that uses the electronic key unique encryption code. The electronic key ID verification performed under a situation in which the electronic key 2 is located outside the vehicle 1 is referred to as exterior smart verification. When exterior smart verification is accomplished, the verification ECU 9 permits or performs locking or unlocking of the vehicle door 13 with the body ECU 10.

The electronic key ID verification performed under a situation in which the electronic key 2 is located inside the vehicle 1 is referred to as interior smart verification. When interior smart verification is accomplished, the verification ECU 9 permits the shifting of devices supplied with power when an engine switch 18 is operated. For example, when the engine switch 18 is operated in a state in which the brake pedal is depressed, the verification ECU 9 starts the engine 6 with the engine ECU 11.

The vehicle 1 is provided with a car sharing system 21 that allows the vehicle 1 to be shared by a number of people. In the present example, the car sharing system 21 includes a car share device 23 installed in the vehicle 1. The car share device 23 is configured to verify the electronic key ID used by the electronic key system 4 of the vehicle 1. Further, the car share device 23 is configured to establish wireless communication with a mobile terminal 22. Encrypted code information Dk obtained from, for example, an external device such as a server 20 is registered to the mobile terminal 22. The car share device 23 obtains the code information Dk from the mobile terminal 22 and authenticates the code information Dk. In the present example, the car share device 23 includes an encryption code (car share device unique encryption code) used to decode the code information Dk. The code information Dk is authenticated when decoded. After the code information Dk is authenticated, the mobile terminal 22 is configured to transmit an operation request to the car share device 23 to request for actuation of the on-board device 3. The mobile terminal 22 may be, for example, a smartphone. Preferably, the code information Dk is, for example, a one-time key (one-time password) that can be used only once.

The car share device 23 is independent from the hardware configuration of the electronic key system 4 and may be retrofitted to the vehicle 1. The car share device 23, for example, functions as an electronic key (vehicle key) that is valid only during the reserved time of the vehicle 1 and is similar to a spare key. In the present example, the car share device 23 cooperates with the mobile terminal 22 so that the mobile terminal 22 functions as a vehicle key in place of the electronic key 2. The car share device 23 has an electronic key function that is switched between a valid state and an invalid state. A state in which the electronic key function of the car share device 23 is valid is equivalent to a state in which an electronic key exists in the vehicle 1. A state in which the electronic key function is invalid is equivalent to a state in which an electronic key does not exist in the vehicle 1. The car share device 23 is supplied with power from a battery +B of the vehicle 1.

In a non-restrictive example, the mobile terminal 22 includes a terminal control unit 26, a network communication module 27, a near-field wireless communication module 28, and a memory 29. The terminal control unit 26 controls the operation of the mobile terminal 22. The network communication module 27 is used to perform network communication between the mobile terminal 22 and an external device such as the server 20. The near-field wireless communication module 28 is used to perform near-field wireless communication between the mobile terminal 22 and the car share device 23. The memory 29 is a data rewritable memory. The mobile terminal 22 obtains the code information Dk from the server 20 via the network communication module 27 and writes the code information Dk to the memory 29. The near-field wireless communication is performed in compliance with, for example, Bluetooth (registered trademark), preferably, Bluetooth® Low Energy (BLE).

A user interface (UI) application 30 is installed in the mobile terminal 22 to manage operation of the car sharing system 21. The UI application 30 is, for example, downloaded from the server 20 and installed in the terminal control unit 26. In the present example, a user authentication code is registered to the memory 29 of the mobile terminal 22. The user authentication code is used when the mobile terminal 22 communicates with the car share device 23 of the vehicle 1 to actuate the on-board device 3 in accordance with the operation of the mobile terminal 22. The user authentication code may be, for example, a random number of which value changes whenever generated. The user authentication code may be registered in advance to the car sharing system 21 or generated when the vehicle 1 is used.

In a non-restrictive example, the car share device 23 includes a controller 33, a smart communication block 34, a near-field wireless module 35, a memory 36, and a timer 37. The controller 33 controls operation of the car share device 23. The smart communication block 34 is used to establish smart communication (short range wireless communication) between the car share device 23 and the electronic key system 4 (verification ECU 9). The near-field wireless module 35 is used to establish near-field wireless communication between the mobile terminal 22 and the car share device 23.

The memory 36 is a data rewritable memory. The memory 36 stores a car share device ID, a car share device unique encryption code, the electronic key ID, and the electronic key unique encryption code. The car share device ID and the car share device unique encryption code are information unique to the car share device 23. The car share device unique encryption code is used to decode the code information Dk used for encrypted communication between the mobile terminal 22 and the car share device 23. The car share device unique encryption code may be stored in the server 20. The mobile terminal 22 may obtain the code information Dk, which is encrypted by the car share device unique encryption code, from the server 20. The car share device ID is, for example, associated with a vehicle ID (vehicle body number). This associates the car share device 23 with the vehicle 1. As described above, the electronic key ID and the electronic key unique encryption code are information unique to the electronic key 2 and used for electronic key ID verification (in the present example, smart verification) performed with the electronic key system 4. The timer 37 manages the date and time in the car share device 23. The timer 37 is implemented by, for example, a soft timer.

The car share device 23 includes a key function unit 38 that performs electronic key ID verification (in the present example, smart verification) through smart communication established by the smart communication block 34 between the electronic key system 4 (verification ECU 9) and the car share device 23. The key function unit 38 is arranged in the controller 33. For example, the car share device 23 includes one or more processors and a memory storing one or more instructions. The one or more processors execute instructions so that the controller 33 functions as the key function unit 38. The key function unit 38 obtains the code information Dk from the mobile terminal 22 and authenticates the code information Dk. When authentication of the code information Dk is accomplished in a normal manner, the key function unit 38 is allowed to perform electronic key ID verification through smart communication with the verification ECU 9. For example, when the mobile terminal 22 is operated to actuate the on-board device 3, the key function unit 38 performs electronic key ID verification (in the present example, smart verification) between the car share device 23 and the verification ECU 9 through a process similar to the electronic key ID verification performed between the electronic key 2 and the verification ECU 9. When electronic key ID verification is accomplished, actuation of the on-board device 3 is performed or permitted in accordance with operation of the mobile terminal 22.

The car sharing system 21 further includes an encryption code updating unit 41 that updates an encryption code (in the present example, user authentication code) used for encrypted communication between the mobile terminal 22 and the car share device 23. For example, the encryption code updating unit 41 is arranged in the controller 33 of the car share device 23. In this case, a processor of the car share device 23 executes instructions so that the controller 33 functions as the encryption code updating unit 41. When the mobile terminal 22 and the car share device 23 are reconnected, the encryption code updating unit 41 updates a first encryption code that was used in a previous connection of the mobile terminal 22 and the car share device 23 to a second encryption code that differs from the first encryption code.

The operation of the car sharing system 21 will now be described with reference to FIGS. 2 to 4.

Initial Connection

Figure 3:
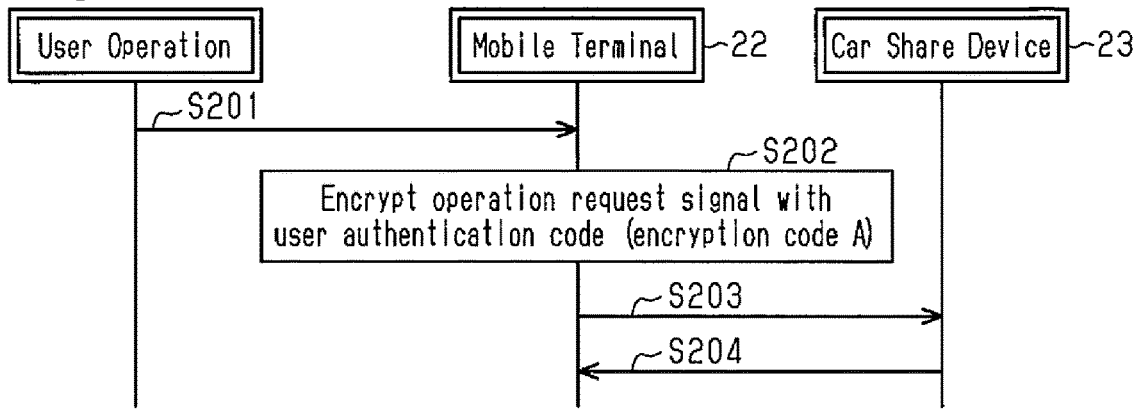
FIG. 3 is a diagram illustrating an example communication sequence for a case in which a mobile terminal is operated to actuate an on-board device.

With reference to FIGS. 2 and 3, the actions taken when the mobile terminal 22 and the car share device 23 are initially connected will now be described. When the vehicle 1 (car sharing system 21) is used for the first time, the user, for example, reserves the vehicle 1 with the mobile terminal 22. When the vehicle 1 is reserved, the server 20 transmits the code information Dk to the mobile terminal 22. During the initial connection, the mobile terminal 22 communicates with the car share device 23 based on the code information Dk. One example of an initial connection will now be described.

As illustrated in FIG. 2, in step S101, the server 20 authenticates the user of the mobile terminal 22 (user reserving vehicle 1) through network communication with the mobile terminal 22 (UI application 30). For example, the user authentication is performed using a user ID and a password input to the mobile terminal 22 (UI application 30). In the user authentication, a usage reservation procedure is performed to register reservation information of the vehicle 1. The reservation information of the vehicle 1 includes, for example, the reserved vehicle and the reserved date and time. When the user has been authenticated by the server 20 with the user ID and password, the process proceeds to step S102. When user authentication is unaccomplished, the process is forcibly ended.

In step S102, the server 20 generates the code information Dk. For example, the car share device unique encryption code of the car share device 23 installed in the vehicle 1 (reserved vehicle) may be registered to the server 20. The server 20 may use the car share device unique encryption code to generate the code information Dk. For example, the server 20 uses an encryption expression (encryption algorithm) to encrypt a plain text with the car share device unique encryption code and obtain the encrypted text as the code information Dk. The information of the plain text includes, for example, the reserved date and time of the vehicle 1, a terminal ID that is unique to the mobile terminal 22, the user authentication code used as an encryption code for encrypted communication between the mobile terminal 22 and the car share device 23, and the like. Accordingly, the code information Dk includes the reserved time and date, the terminal ID, and the user authentication code. In the description hereafter, the user authentication code included in the code information Dk may be referred to as the encryption code A.

In step S103, the server 20 transmits the code information Dk to the mobile terminal 22 through network communication. For example, a common code (hereafter referred to as the common code X) used for encrypted communication of the user authentication code between the mobile terminal 22 and the car share device 23 may be transmitted together with the code information Dk to the server 20. Preferably, in this case, the common code X and the code information Dk are also encrypted with any other common code and transmitted as encrypted data from the server 20 to the mobile terminal 22. When the mobile terminal 22 receives the encrypted data from the server 20, the mobile terminal 22 decodes the encrypted data with the common code that was used to generate the encrypted data so as to obtain the common code X and the code information Dk.

In step S104, the mobile terminal 22 (UI application 30) executes near-field wireless communication (in the present example, BLE) connection with the car share device 23. For example, the car share device 23 cyclically transmits advising packets. When the mobile terminal 22 receives an advising packet in the reservation period during which the vehicle 1 is rented, the mobile terminal 22 transmits a communication connection request to the car share device 23. In response to the communication connection request from the mobile terminal 22, the car share device 23 establishes BLE communication with the mobile terminal 22. The car share device 23 transmits a communication connection acknowledgement notifying the establishment of BLE communication to the mobile terminal 22.

In step S105, the car share device 23 transmits a code information request that requests for the code information Dk to the mobile terminal 22. In step S106, in response to the code information request, the UI application 30 of the mobile terminal 22 transmits the code information Dk to the car share device 23.

In step S107, the car share device 23 authenticates the code information Dk. In the present example, the car share device 23 uses the car share device unique encryption code to decode the code information Dk. When decoding of the code information Dk is accomplished, the car share device 23 determines that the code information Dk transmitted from the mobile terminal 22 is correct. When authentication of the code information Dk is successful, the car share device 23 extracts the reservation date and time, the terminal ID, and the user authentication code from the code information Dk.

When authentication of the code information Dk is unsuccessful, the car share device 23 determines that the code information Dk is incorrect and shuts down communication.

In step S108, the car share device 23 transmits the encryption code A (user authentication code) to the mobile terminal 22. In the present example, the encryption code A is encrypted with the common code X and transmitted as encrypted data from the car share device 23 to the mobile terminal 22. The common code X may be registered in advance to the car share device 23 or provided from the mobile terminal 22 to the car share device 23. When the mobile terminal 22 receives the encrypted data from the car share device 23, the mobile terminal 22 decodes the encrypted data with the common code X to obtain the encryption code A (user authentication code).

In step S109, the UI application 30 of the mobile terminal 22 transmits the electronic key function validation request to the car share device 23. Preferably, the electronic key function validation request is encrypted by any other encryption code when transmitted to the car share device 23. The electronic key function validation request is a request for switching the electronic key function (key function unit 38) of the car share device 23 to a valid state.

In step S110, in response to the electronic key function validation request from the mobile terminal 22, the car share device 23 switches the electronic key function (key function unit 38) from an invalid state to a valid state. This allows the car share device 23 to execute electronic key ID verification through LF-UHF bidirectional communication with the verification ECU 9.

In step S111, the car share device 23 stores the code information Dk and the encryption code A (user authentication code) in the memory 36. After the code information Dk and the encryption code A (user authentication code) are stored in the memory 36, the mobile terminal 22 and the car share device 23 both shift to an authentication completion state. This allows the mobile terminal 22 to be used in place of the electronic key 2 as an electronic key (vehicle key) of the vehicle 1.

As illustrated in FIG. 3, in step S201, the user operates and activates an operation request button of the mobile terminal 22 which is in the authentication completion state. The operation request button is used to actuate the on-board device 3 and may be, for example, an unlock request button for unlocking the vehicle door 13, a lock request button for locking the vehicle door 13, an engine start button for starting the engine 6, or the like.

In step S202, the UI application 30 of the mobile terminal 22 encrypts an operation request signal, which corresponds to the operation request button, with the encryption code A (user authentication code). In a non-restrictive example, the operation request signal may include a device actuation command corresponding to the operation request button, the electronic key ID, and the electronic key unique encryption code.

In step S203, the UI application 30 of the mobile terminal 22 transmits the encrypted operation request signal to the car share device 23 through near-field wireless communication (BLE communication).

In step S204, when the car share device 23 receives the operation request signal, the car share device 23 transmits a request acceptance response to the mobile terminal 22. Then, the car share device 23 communicates with the electronic key system 4 and actuates the on-board device 3 in accordance with the received operation request signal. In a non-restrictive example, the car share device 23 establishes smart communication with the verification ECU 9 of the electronic key system 4 through the smart communication block 34 and sends a device actuation command and the electronic key ID to the verification ECU 9. The verification ECU 9 performs electronic key ID verification. When the electronic key ID verification is accomplished, the verification ECU 9 sends the device actuation command to the on-board device ECU of the corresponding on-board device 3 to actuate the corresponding on-board device 3.

For example, if the device actuation command is an unlock request command for the vehicle door 13, the body ECU 10 actuates the door lock device 5 to unlock the vehicle door 13. If the device actuation command is a lock request command for the vehicle door 13, the body ECU 10 actuates the door lock device 5 to lock the vehicle door 13. If the device actuation command is a starting request command for the engine 6, the engine ECU 11 permits starting of the engine 6. For example, if the engine switch 18 is operated when the brake pedal is depressed, the engine ECU 11 starts the engine 6. In addition to electronic key ID verification, challenge-response authentication using the electronic key unique encryption code may be performed between the verification ECU 9 and the car share device 23 if necessary. In this manner, smart verification may be performed between the car share device 23 and the verification ECU 9 in the same manner as the smart verification performed between the electronic key 2 and the verification ECU 9.

Reconnection

Figure 4:
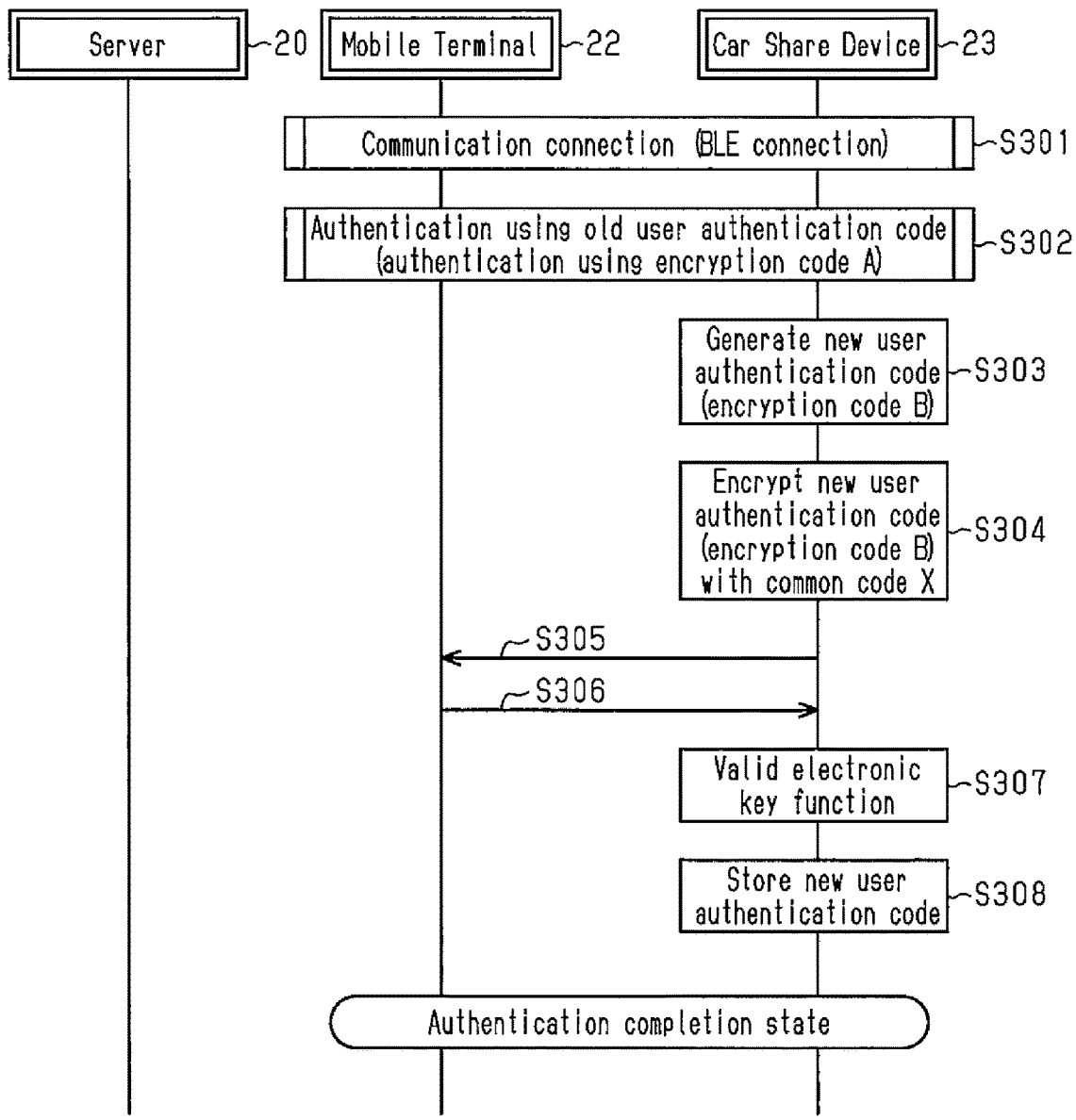
FIG. 4 is a diagram illustrating an example communication sequence for a reconnection.

With reference to FIG. 4, an operation for reconnecting the mobile terminal 22 and the car share device 23 will now be described. Reconnection refers to connection of the mobile terminal 22 and the car share device 23 subsequent to the initial connection when operating the mobile terminal 22 to use the vehicle 1. In this case, the mobile terminal 22 has already obtained the code information Dk during the initial connection.

As illustrated in FIG. 4, in step S301, the mobile terminal 22 (UI application 30) performs a near-field wireless communication (in the present example, BLE) connection process with the car share device 23. The process of step S301 is similar to that of step S104.

In step S302, the car share device 23 performs authentication through bidirectional communication with the UI application 30 of the mobile terminal 22. In the present example, the authentication performed through bidirectional communication is challenge-response authentication. The car share device 23 performs the challenge-response authentication using an old user authentication code (encryption code A) registered in both of the mobile terminal 22 and the car share device 23.

The challenge-response authentication of a non-restrictive example will now be described. The car share device 23 first transmits a challenge code to the mobile terminal 22. The challenge code is, for example, a random number of which the value changes whenever challenge-response authentication is executed. The mobile terminal 22 uses the old user authentication code (encryption code A) stored in the memory 29 to calculate a response code from the received challenge code. The mobile terminal 22 transmits the calculated response code to the car share device 23.

The car share device 23 also uses the old user authentication code (encryption code A) stored in the memory 36 to calculate a response code from the challenge code that was transmitted to the mobile terminal 22. The car share device 23 compares the calculated response code with the response code transmitted from the mobile terminal 22. The car share device 23 determines that the challenge-response authentication has been accomplished when the two response codes match.

When the challenge-response authentication using the old user authentication code (encryption code A) has been accomplished, in step S303, the encryption code updating unit 41 generates a new user authentication code (hereafter referred to as the encryption code B). That is, the encryption code updating unit 41 updates the encryption code A to the encryption code B. The process for generating the encryption code B is not particularly limited as long as the encryption code B differs from the encryption code A.

In step S304, the encryption code updating unit 41 encrypts the new user authentication code (encryption code B) with the common code X.

In step S305, the car share device 23 transmits the new user authentication code (the encryption code B), which is encrypted with the common code X, as encrypted data to the mobile terminal 22. When the mobile terminal 22 receives the encrypted data from the car share device 23, the mobile terminal 22 decodes the encrypted data with the common code X to obtain the encryption code B.

In step S306, the UI application 30 of the mobile terminal 22 transmits the electronic key function validation request to the car share device 23. In the same manner as step S109, the electronic key function validation request is encrypted with a predetermined encryption code and then transmitted to the car share device 23.

In step S307, the car share device 23 switches the key function unit 38 from an invalid state to a valid state in response to the electronic key function validation request from the mobile terminal 22. This allows the car share device 23 to execute electronic key ID verification through LF-UHF bidirectional communication with the verification ECU 9.

In step S308, the car share device 23 stores the new user authentication code (encryption code B) in the memory 36, and the user authentication code is rewritten from the encryption code A to the encryption code B. When the encryption code B is stored in the memory 36, the mobile terminal 22 and the car share device 23 both shift to an authentication completion state. This allows the mobile terminal 22 to be used in place of the electronic key 2 as the electronic key (vehicle key) of the vehicle 1.

Subsequently, whenever the mobile terminal 22 is reconnected to the car share device 23, the user authentication code is updated to a new one. For example, after completion of the communication using the encryption code B established between the mobile terminal 22 and the car share device 23, reconnection of the mobile terminal 22 with the car share device 23 updates the user authentication code from the encryption code B to a new and different encryption code. In this manner, the user authentication code is updated whenever reconnected.

The car sharing system 21 has the advantages described below.

The user authentication code is updated whenever the mobile terminal 22 is reconnected to the car share device 23. After the reconnection, a previously used user authentication code cannot be used when the mobile terminal 22 communicates with the car share device 23 to request for actuation of the on-board device 3. This limits unauthorized use of the user authentication code and improves security for communication between the mobile terminal 22 and the car share device 23.

The code information Dk is transmitted from the server 20 to the mobile terminal 22 when the vehicle 1 is used for the first time. When initially connected, the car share device 23 obtains the code information Dk from the mobile terminal 22 and authenticates the code information Dk. When authentication of the code information Dk is accomplished, the car share device 23 extracts the user authentication code from the code information Dk and transmits the user authentication code to the mobile terminal 22. In this manner, the initial connection uses the user authentication code that is obtained by authenticating the code information Dk from the server 20 to the mobile terminal 22. This is advantageous for safely obtaining the user authentication code.

The encryption code updating unit 41 is arranged in the car share device 23. When updating the user authentication code, the car share device 23 generates a new user authentication code. This improves security. Further, there is no need to use another device that generates the user authentication code.

When reconnecting the mobile terminal 22 and the car share device 23, the encryption code updating unit 41 performs authentication through bidirectional communication (in the present example, challenge-response authentication) with the old user authentication code used in the previous connection. Upon accomplishment of the authentication performed through bidirectional communication, the encryption code updating unit 41 generates the new user authentication code. Thus, when updating the user authentication code, authentication has to be accomplished with the old user authentication code that was used in the previous communication. Thus, the user authentication code is updated further safely.

It should be apparent to those skilled in the art that the foregoing embodiments may be implemented in many other specific forms without departing from the scope of this disclosure. Particularly, it should be understood that the foregoing embodiments may be implemented in the following forms.

The updating of the encryption code does not have to be performed whenever the mobile terminal 22 and the car share device 23 are reconnected and may be performed once every predetermined number of times the mobile terminal 22 and the car share device 23 are reconnected. In this manner, the updating timing may be changed in any manner.

The encryption code updating unit 41 does not have to be arranged in the car share device 23 and may be arranged in another device such as the mobile terminal 22.

The updated encryption code is not limited to the user authentication code and any other encryption code may be used instead.

The mobile terminal 22 and the car share device 23 may obtain the user authentication code through any procedure or process.

The code information Dk does not have to be encrypted by the car share device unique encryption code and may be encrypted by any other encryption code.

The content of the code information Dk may be changed to one other than that of the above embodiment.

The code information Dk does not have to be generated by the server 20 and may be generated by any other external device.

The condition for switching the key function unit 38 from an invalid state to a valid state is not limited to the condition described above and may be any other condition.

The engine 6 may be started by, for example, operating an "engine start" button shown on the display of the mobile terminal 22.

In the smart verification of the key-operation-free system (electronic key system 4), the exterior transmitter and the interior transmitter do not have to be used to determine whether the electronic key 2 is located inside the vehicle 1 or outside the vehicle 1. For example, left and right antennas (LF antennas) may be arranged on the vehicle body, and the combination of the response of the electronic key 2 to the radio waves transmitted from each antenna may be checked to determine whether the electronic key 2 is located inside the vehicle 1 or outside the vehicle 1.

The smart verification of the electronic key system 4 does not have to perform both electronic key ID verification and challenge-response authentication. As long as electronic key ID verification is performed, any verification process may be performed. Further, any verification may be performed in lieu of the challenge-response authentication.

In the electronic key system 4, instead of using the verification ECU 9, the electronic key 2 may initiate wireless communication and execute electronic key ID verification.

The electronic key 2 is not limited to a Smart Key (registered trademark) and may be any other wireless key.

The near-field wireless communication is not limited to Bluetooth communication and may be of any type of communication protocol.

The code information Dk is not limited to a one-time key and may be any information of which use is restricted.

The encryption code used for encrypted communication may be, for example, any one of the car share device unique encryption code, the user authentication code, and the electronic key unique encryption code. For example, the encryption code used during a process may be switched to improve communication security.

Communication between the verification ECU 9 (electronic key system 4) and the car share device 23 is not limited to wireless communication and may be wired communication.

There is no limit to where the car share device 23 is installed.

The mobile terminal 22 is not limited to a smartphone and may be any other mobile terminal.

All examples and conditional language recited herein are intended for pedagogical purposes to aid the reader in understanding the principles of the invention and the concepts contributed by the inventors to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

The invention claimed is:

1. A car sharing system, comprising:
a car share device installed in a vehicle and including a controller and a memory, the memory storing an electronic key ID and a care share device unique encryption code,
wherein when the car share device is initially connected to a mobile terminal, the controller of the car share device
obtains code information from the mobile terminal through wireless communication with the mobile terminal, the code information including a first encryption code,
decodes the code information with the car share device unique encryption code,
determines that authentication of the code information is successful when decoding of the code information is accomplished,
extracts the first encryption code from the code information when the authentication of the code information is successful,
transmits the first encryption code to the mobile terminal,
upon reception of an operation request signal encrypted with the first encryption code from the mobile terminal, verifies the electronic key ID through smart communication with an electronic key system of the vehicle, and
permits actuation of an on-board device according to the operation request signal when the electronic key ID is verified; and
wherein when the car share device is reconnected to the mobile terminal, the controller of the car share device
performs a challenge-response authentication through bidirectional communication with the mobile terminal by using the first encryption code that was used for encryption of the operation request signal during the initial connection,
operates as an encryption code updating unit that updates the first encryption code to a second encryption code different from the first encryption code when the challenge-response authentication using the first encryption code is accomplished, and
upon reception of an operation request signal encrypted with the second encryption code from the mobile terminal, verifies the electronic key ID through the smart communication with the electronic key system.

2. The car sharing system according to claim 1, wherein: the code information is transmitted from an external device to the mobile terminal when the vehicle is used for a first time.

3. The car sharing system according to claim 1, wherein: the controller of the car share device is operable as a key function unit that verifies the electronic key ID;
when the mobile terminal and the car share device are initially connected, the key function unit becomes valid after the code information is authenticated and the first encryption code of the code information is obtained by the mobile terminal; and
when the mobile terminal and the car share device are reconnected, the key function unit becomes valid after authentication using the first encryption code is accomplished and the second encryption code is generated.

4. The car sharing system according to claim 3, wherein in response to obtaining the first encryption code, the mobile terminal transmits an electronic key function validation request to the car share device to switch the key function unit of the car share device to a valid state.

* * * * *

UNITED STATES PATENT AND TRADEMARK OFFICE
CERTIFICATE OF CORRECTION

PATENT NO. : 11,228,600 B2  
APPLICATION NO. : 16/151943  
DATED : January 18, 2022  
INVENTOR(S) : Hajime Takeuchi et al.

Page 1 of 1

It is certified that error appears in the above-identified patent and that said Letters Patent is hereby corrected as shown below:

On the Title Page

Insert:
-- (30) Foreign App. Priority Data
2017-196933 JP 2017-10-10 --.

Signed and Sealed this
Ninth Day of August, 2022

Katherine Kelly Vidal
*Director of the United States Patent and Trademark Office*